United States Patent
Meltzer et al.

(10) Patent No.: US 9,565,147 B2
(45) Date of Patent: Feb. 7, 2017

(54) SYSTEM AND METHODS FOR MULTIPLE EMAIL SERVICES HAVING A COMMON DOMAIN

(71) Applicant: Go Daddy Operating Company, LLC, Scottsdale, AZ (US)

(72) Inventors: Jason Meltzer, Chandler, AZ (US); Jason Haslup, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 326 days.

(21) Appl. No.: 14/320,258

(22) Filed: Jun. 30, 2014

(65) Prior Publication Data

US 2015/0381561 A1 Dec. 31, 2015

(51) Int. Cl.
*H04L 29/12* (2006.01)
*H04L 12/58* (2006.01)

(52) U.S. Cl.
CPC ............. *H04L 51/066* (2013.01); *H04L 51/14* (2013.01); *H04L 61/1511* (2013.01); *H04L 61/307* (2013.01); *H04L 61/3055* (2013.01)

(58) Field of Classification Search
CPC  H04L 61/1564; H04L 61/1511; H04L 61/307; H04L 51/066; G06Q 10/107
USPC ........................................................ 709/206
See application file for complete search history.

(56) References Cited

U.S. PATENT DOCUMENTS

| | | | |
|---|---|---|---|
| 5,228,123 A | 7/1993 | Heckel | |
| 5,404,294 A | 4/1995 | Karnik | |
| 5,414,841 A | 5/1995 | Bingham et al. | |
| 5,426,594 A | 6/1995 | Wright et al. | |
| 5,940,740 A | 8/1999 | Aas et al. | |
| 5,956,521 A | 9/1999 | Wang | |
| 5,995,597 A | 11/1999 | Woltz et al. | |
| 5,999,932 A | 12/1999 | Paul | |
| 6,023,723 A | 2/2000 | McCormick et al. | |
| 6,052,709 A | 4/2000 | Paul | |
| 6,092,101 A | 7/2000 | Birrell et al. | |
| 6,148,064 A | 11/2000 | Christensen et al. | |
| 6,161,130 A | 12/2000 | Horvitz et al. | |
| 6,167,434 A | 12/2000 | Pang | |

(Continued)

FOREIGN PATENT DOCUMENTS

| | | |
|---|---|---|
| GB | 2347053 | 8/2000 |
| JP | 10275119 | 10/1998 |
| WO | 9858332 | 12/1998 |

OTHER PUBLICATIONS

Bell, Webmail: An Automated Web Publishing System, 1999.

(Continued)

*Primary Examiner* — Chris Parry
*Assistant Examiner* — Stephen Houlihan
(74) *Attorney, Agent, or Firm* — Quarles & Brady LLP

(57) ABSTRACT

Systems and methods provide an ability to split multiple email addresses having the same email domain across a plurality of email service providers. A first email server receives a forwarded email message from a second email server, the forwarded email message including an original domain and an intermediary domain, the intermediary domain added by the second email server. The first email server removes the intermediary domain from the recipient address and delivers the email message to a corresponding email account that is serviced by the first email server.

16 Claims, 4 Drawing Sheets

(56) References Cited

U.S. PATENT DOCUMENTS

| | | |
|---|---|---|
| 6,167,435 A | 12/2000 | Druckenmiller et al. |
| 6,185,551 B1 | 2/2001 | Birrell et al. |
| 6,192,396 B1 | 2/2001 | Kohler |
| 6,205,358 B1 | 3/2001 | Haeg et al. |
| 6,212,265 B1 | 4/2001 | Duphorne |
| 6,223,213 B1 | 4/2001 | Cleron et al. |
| 6,230,188 B1 | 5/2001 | Marcus |
| 6,249,805 B1 | 6/2001 | Fleming, III |
| 6,266,692 B1 | 7/2001 | Greenstein |
| 6,335,963 B1 | 1/2002 | Bosco |
| 6,353,852 B1 | 3/2002 | Nestoriak, III et al. |
| 6,356,937 B1 | 3/2002 | Montville et al. |
| 6,360,221 B1 | 3/2002 | Gough et al. |
| 6,374,246 B1 | 4/2002 | Matsuo |
| 6,385,655 B1 | 5/2002 | Smith et al. |
| 6,396,513 B1 | 5/2002 | Helfman et al. |
| 6,434,600 B2 | 8/2002 | Waite et al. |
| 6,446,118 B1 | 9/2002 | Gottlieb |
| 6,499,021 B1 | 12/2002 | Abu-Hakima |
| 6,505,236 B1 | 1/2003 | Pollack et al. |
| 6,584,564 B2 | 6/2003 | Olkin et al. |
| 6,615,241 B1 | 9/2003 | Miller et al. |
| 6,640,301 B1 | 10/2003 | Ng |
| 6,643,687 B1 | 11/2003 | Dickie et al. |
| 6,643,694 B1 | 11/2003 | Chernin |
| 6,654,787 B1 | 11/2003 | Aronson et al. |
| 6,658,622 B1 | 12/2003 | Aiken et al. |
| 6,704,772 B1 | 3/2004 | Ahmed et al. |
| 6,721,784 B1 | 4/2004 | Leonard et al. |
| 6,755,694 B2 | 6/2004 | Ries et al. |
| 6,760,707 B2 | 7/2004 | Provost |
| 6,772,139 B1 | 8/2004 | Smith, III |
| 6,792,312 B2 | 9/2004 | Bruchmann et al. |
| 6,865,594 B1 * | 3/2005 | Belissent .......... H04L 29/12066 709/206 |
| 6,868,436 B1 | 3/2005 | Fleming, III |
| 6,901,398 B1 | 5/2005 | Horvitz et al. |
| 6,959,324 B1 | 10/2005 | Kubik et al. |
| 6,963,903 B2 | 11/2005 | Krueger et al. |
| 6,970,908 B1 | 11/2005 | Larky et al. |
| 6,986,049 B2 | 1/2006 | Delany |
| 7,010,572 B1 | 3/2006 | Benjamin et al. |
| 7,051,273 B1 | 5/2006 | Holt et al. |
| 7,062,536 B2 | 6/2006 | Fellenstein et al. |
| 7,072,944 B2 | 7/2006 | Ladonde et al. |
| 7,103,853 B1 | 9/2006 | Patil |
| 7,106,471 B2 | 9/2006 | Ohwa |
| 7,124,087 B1 | 10/2006 | Rodriguez et al. |
| 7,130,887 B2 | 10/2006 | Goldberg |
| 7,139,802 B2 | 11/2006 | Keohane et al. |
| 7,158,986 B1 | 1/2007 | Oliver et al. |
| 7,194,513 B2 | 3/2007 | Sharif et al. |
| 7,240,095 B1 | 7/2007 | Lewis |
| 7,246,305 B2 | 7/2007 | Batres |
| 7,290,219 B2 | 10/2007 | Boyles et al. |
| 7,293,171 B2 | 11/2007 | Batthish et al. |
| 7,320,021 B2 | 1/2008 | Lalonde et al. |
| 7,333,233 B2 | 2/2008 | Gauthier |
| 7,346,662 B2 | 3/2008 | Koch et al. |
| 7,359,948 B2 | 4/2008 | Ralston et al. |
| 7,392,293 B2 | 6/2008 | Leonik |
| 7,403,953 B2 | 7/2008 | Lockhart |
| 7,428,576 B2 | 9/2008 | Shuster |
| 7,437,558 B2 | 10/2008 | Fenton et al. |
| 7,457,823 B2 | 11/2008 | Shraim et al. |
| 7,457,842 B2 | 11/2008 | Heilmann |
| 7,523,168 B2 | 4/2009 | Chadwick et al. |
| 7,532,355 B2 | 5/2009 | Gauthier et al. |
| 7,548,952 B2 | 6/2009 | Delia et al. |
| 7,584,417 B2 | 9/2009 | Friend et al. |
| 7,636,883 B2 | 12/2009 | Albornoz et al. |
| 7,680,891 B1 | 3/2010 | Pongsajapan |
| 7,711,779 B2 | 5/2010 | Goodman et al. |
| 7,716,602 B2 | 5/2010 | Etgen |
| 7,743,105 B2 | 6/2010 | Bauchot et al. |
| 7,743,334 B2 | 6/2010 | Rider |
| 7,890,593 B2 | 2/2011 | Chen et al. |
| 7,912,906 B2 | 3/2011 | Thayer |
| 7,917,389 B2 | 3/2011 | Mooney |
| 7,921,162 B2 | 4/2011 | Ruiz |
| 7,937,446 B2 | 5/2011 | Rechterman et al. |
| 7,941,491 B2 | 5/2011 | Sood |
| 7,945,954 B2 | 5/2011 | Coueignoux |
| 7,979,493 B2 | 7/2011 | Rechterman et al. |
| 7,979,793 B2 | 7/2011 | Miller et al. |
| 7,992,204 B2 | 8/2011 | Shraim et al. |
| 8,010,599 B2 | 8/2011 | Chang et al. |
| 8,041,769 B2 | 10/2011 | Shraim et al. |
| 8,086,684 B2 | 12/2011 | Hayes et al. |
| 8,099,465 B2 | 1/2012 | Daniels et al. |
| 8,108,763 B2 | 1/2012 | Gao et al. |
| 8,117,339 B2 | 2/2012 | Adelman et al. |
| 8,145,707 B2 | 3/2012 | Thayer et al. |
| 8,156,190 B2 | 4/2012 | Thayer et al. |
| 8,185,741 B1 | 5/2012 | Agrawal et al. |
| 8,291,024 B1 | 10/2012 | Cheng et al. |
| 8,352,742 B2 | 1/2013 | Thayer et al. |
| 8,572,192 B2 | 10/2013 | Hardy |
| 8,572,227 B2 | 10/2013 | Toomey et al. |
| 8,572,496 B2 | 10/2013 | Koopman |
| 2001/0047389 A1 | 11/2001 | Prahlad et al. |
| 2002/0010746 A1 | 1/2002 | Jilk et al. |
| 2002/0019827 A1 | 2/2002 | Shiman et al. |
| 2002/0023135 A1 | 2/2002 | Shuster |
| 2002/0023136 A1 | 2/2002 | Silver et al. |
| 2002/0046250 A1 | 4/2002 | Nassiri |
| 2002/0049727 A1 | 4/2002 | Rothkopf |
| 2002/0059144 A1 | 5/2002 | Meffert et al. |
| 2002/0061021 A1 | 5/2002 | Dillon |
| 2002/0091776 A1 | 7/2002 | Nolan et al. |
| 2002/0099681 A1 | 7/2002 | Gainey et al. |
| 2002/0107930 A1 | 8/2002 | Itoh |
| 2002/0120695 A1 | 8/2002 | Engstrom |
| 2002/0124675 A1 | 9/2002 | Besprosvan |
| 2002/0131561 A1 | 9/2002 | Gifford et al. |
| 2002/0138580 A1 | 9/2002 | Al-Kazily et al. |
| 2002/0143877 A1 | 10/2002 | Hackbarth et al. |
| 2002/0169840 A1 | 11/2002 | Sheldon et al. |
| 2002/0174417 A1 | 11/2002 | Sijacic et al. |
| 2002/0188583 A1 | 12/2002 | Rukavina et al. |
| 2002/0188690 A1 | 12/2002 | Lee |
| 2003/0009529 A1 | 1/2003 | Powers |
| 2003/0018721 A1 | 1/2003 | Gupta et al. |
| 2003/0020959 A1 | 1/2003 | Henry |
| 2003/0037261 A1 | 2/2003 | Meffert et al. |
| 2003/0074411 A1 | 4/2003 | Nale |
| 2003/0081591 A1 | 5/2003 | Cheung et al. |
| 2003/0110443 A1 | 6/2003 | Yankovich et al. |
| 2003/0154085 A1 | 8/2003 | Kelley |
| 2003/0172116 A1 | 9/2003 | Curry et al. |
| 2003/0191969 A1 | 10/2003 | Katsikas |
| 2004/0019649 A1 | 1/2004 | Tanimoto |
| 2004/0019780 A1 | 1/2004 | Waugh et al. |
| 2004/0039786 A1 | 2/2004 | Horvitz et al. |
| 2004/0117736 A1 | 6/2004 | Newman |
| 2004/0119740 A1 | 6/2004 | Chang et al. |
| 2004/0128356 A1 | 7/2004 | Bernstein et al. |
| 2004/0133520 A1 | 7/2004 | Callas et al. |
| 2004/0158607 A1 | 8/2004 | Coppinger et al. |
| 2004/0177120 A1 | 9/2004 | Kirsch |
| 2004/0181430 A1 | 9/2004 | Fotsch et al. |
| 2004/0199597 A1 | 10/2004 | Libbey et al. |
| 2004/0199598 A1 | 10/2004 | Kalfas |
| 2004/0205135 A1 | 10/2004 | Hallam-Baker |
| 2004/0205185 A1 | 10/2004 | Leonik |
| 2004/0215606 A1 | 10/2004 | Cossock |
| 2004/0221012 A1 | 11/2004 | Heumesser |
| 2004/0234057 A1 | 11/2004 | Kaye |
| 2005/0004989 A1 | 1/2005 | Satterfield et al. |
| 2005/0039017 A1 | 2/2005 | Delany |
| 2005/0039019 A1 | 2/2005 | Delany |
| 2005/0039119 A1 | 2/2005 | Parks et al. |
| 2005/0044109 A1 | 2/2005 | Nanba |
| 2005/0060643 A1 | 3/2005 | Glass et al. |

(56) References Cited

U.S. PATENT DOCUMENTS

| | | |
|---|---|---|
| 2005/0080855 A1 | 4/2005 | Murray |
| 2005/0100145 A1 | 5/2005 | Spencer et al. |
| 2005/0102348 A1 | 5/2005 | Parsons et al. |
| 2005/0108351 A1 | 5/2005 | Naick et al. |
| 2005/0114450 A1 | 5/2005 | DeVos |
| 2005/0114652 A1 | 5/2005 | Swedor et al. |
| 2005/0132010 A1 | 6/2005 | Muller |
| 2005/0160292 A1 | 7/2005 | Batthish et al. |
| 2005/0165896 A1 | 7/2005 | Mooney |
| 2005/0185212 A1 | 8/2005 | Gauthier |
| 2005/0188045 A1 | 8/2005 | Katsikas |
| 2005/0193076 A1 | 9/2005 | Flury et al. |
| 2005/0198159 A1 | 9/2005 | Kirsch |
| 2005/0216567 A1* | 9/2005 | Ruiz .................. H04L 51/28 709/206 |
| 2005/0220095 A1 | 10/2005 | Narayanan et al. |
| 2005/0223326 A1 | 10/2005 | Chang et al. |
| 2005/0228899 A1 | 10/2005 | Wendkos et al. |
| 2005/0257261 A1 | 11/2005 | Shraim et al. |
| 2005/0273781 A1 | 12/2005 | Nakamura et al. |
| 2005/0278533 A1 | 12/2005 | Mayer |
| 2006/0004763 A1 | 1/2006 | Horvitz et al. |
| 2006/0004896 A1 | 1/2006 | Nelson et al. |
| 2006/0020667 A1 | 1/2006 | Wang et al. |
| 2006/0031314 A1 | 2/2006 | Brahms et al. |
| 2006/0031315 A1 | 2/2006 | Fenton et al. |
| 2006/0031319 A1 | 2/2006 | Nelson et al. |
| 2006/0031329 A1 | 2/2006 | Robertson |
| 2006/0031330 A1 | 2/2006 | Ruiz |
| 2006/0031493 A1 | 2/2006 | Cugi |
| 2006/0039545 A1 | 2/2006 | Rahman et al. |
| 2006/0053202 A1 | 3/2006 | Foo et al. |
| 2006/0068755 A1 | 3/2006 | Shraim et al. |
| 2006/0095397 A1 | 5/2006 | Torres et al. |
| 2006/0095528 A1 | 5/2006 | Sykes |
| 2006/0112268 A1 | 5/2006 | Kamiya et al. |
| 2006/0129628 A1 | 6/2006 | Kamiya et al. |
| 2006/0129635 A1 | 6/2006 | Baccou et al. |
| 2006/0149822 A1 | 7/2006 | Henry et al. |
| 2006/0149823 A1 | 7/2006 | Owen et al. |
| 2006/0168032 A1 | 7/2006 | Cai et al. |
| 2006/0168057 A1 | 7/2006 | Warren et al. |
| 2006/0178155 A1 | 8/2006 | Abramson et al. |
| 2006/0200523 A1 | 9/2006 | Tokuda et al. |
| 2006/0200527 A1 | 9/2006 | Woods |
| 2006/0200530 A1 | 9/2006 | Tokuda et al. |
| 2006/0206572 A1 | 9/2006 | Ladonde et al. |
| 2006/0212522 A1 | 9/2006 | Walter et al. |
| 2006/0212810 A1 | 9/2006 | Segal et al. |
| 2006/0236254 A1 | 10/2006 | Mateescu et al. |
| 2006/0242109 A1 | 10/2006 | Pereira et al. |
| 2007/0016613 A1 | 1/2007 | Foresti et al. |
| 2007/0022162 A1 | 1/2007 | Thayer et al. |
| 2007/0022291 A1 | 1/2007 | Thayer et al. |
| 2007/0022292 A1 | 1/2007 | Thayer et al. |
| 2007/0061400 A1 | 3/2007 | Parsons et al. |
| 2007/0112927 A1 | 5/2007 | Jung |
| 2007/0124396 A1 | 5/2007 | Febonio et al. |
| 2007/0127784 A1 | 6/2007 | Taylor |
| 2007/0156732 A1 | 7/2007 | Surendran et al. |
| 2007/0180031 A1 | 8/2007 | Stern et al. |
| 2007/0180033 A1 | 8/2007 | Singh et al. |
| 2007/0198672 A1 | 8/2007 | Pal et al. |
| 2007/0233790 A1 | 10/2007 | Agarwal et al. |
| 2007/0244977 A1 | 10/2007 | Atkins |
| 2007/0294352 A1 | 12/2007 | Shraim et al. |
| 2007/0299777 A1 | 12/2007 | Shraim et al. |
| 2007/0299915 A1 | 12/2007 | Shraim et al. |
| 2008/0022271 A1 | 1/2008 | D'Angelo et al. |
| 2008/0034046 A1 | 2/2008 | DiPlacido et al. |
| 2008/0059874 A1 | 3/2008 | Spencer |
| 2008/0086369 A1 | 4/2008 | Kiat et al. |
| 2008/0086530 A1 | 4/2008 | Gandhi et al. |
| 2008/0098312 A1 | 4/2008 | Chang et al. |
| 2008/0120692 A1 | 5/2008 | Gupta et al. |
| 2008/0177743 A1 | 7/2008 | Kasatani |
| 2008/0177843 A1 | 7/2008 | Gillum et al. |
| 2008/0186534 A1 | 8/2008 | Sytema |
| 2008/0209208 A1 | 8/2008 | Parkinson |
| 2008/0215686 A1 | 9/2008 | Meredith et al. |
| 2008/0222254 A1 | 9/2008 | Mukherjee |
| 2008/0275873 A1 | 11/2008 | Bosarge et al. |
| 2008/0278740 A1 | 11/2008 | Bird et al. |
| 2008/0288300 A1 | 11/2008 | Emling et al. |
| 2008/0288316 A1 | 11/2008 | Chakra et al. |
| 2008/0294479 A1 | 11/2008 | Emling et al. |
| 2008/0320591 A1 | 12/2008 | Fenton et al. |
| 2009/0037546 A1 | 2/2009 | Kirsch |
| 2009/0063551 A1 | 3/2009 | Shuster |
| 2009/0089377 A1 | 4/2009 | Rubinger |
| 2009/0113293 A1 | 4/2009 | Schubert |
| 2009/0157708 A1 | 6/2009 | Bandini et al. |
| 2009/0172109 A1 | 7/2009 | Weir et al. |
| 2009/0187629 A1 | 7/2009 | Chakra et al. |
| 2009/0214034 A1 | 8/2009 | Mehrotra et al. |
| 2009/0217028 A1 | 8/2009 | Khan et al. |
| 2009/0307323 A1 | 12/2009 | Kato et al. |
| 2009/0313209 A1 | 12/2009 | Lu et al. |
| 2010/0017481 A1 | 1/2010 | Chen et al. |
| 2010/0057859 A1 | 3/2010 | Shen et al. |
| 2010/0057861 A1 | 3/2010 | Nigam et al. |
| 2010/0070592 A1 | 3/2010 | Steuer et al. |
| 2010/0100599 A1 | 4/2010 | Witzany |
| 2010/0106793 A1 | 4/2010 | Parsons et al. |
| 2010/0121879 A1 | 5/2010 | Greenberg |
| 2010/0146059 A1 | 6/2010 | DellaFera et al. |
| 2010/0198927 A1 | 8/2010 | Tonnison et al. |
| 2010/0217837 A1 | 8/2010 | Ansari et al. |
| 2010/0235447 A1 | 9/2010 | Goodman et al. |
| 2010/0250512 A1 | 9/2010 | Miller et al. |
| 2010/0251092 A1 | 9/2010 | Sun |
| 2010/0262662 A1 | 10/2010 | Wang |
| 2010/0269033 A1 | 10/2010 | Siegel |
| 2010/0281535 A1 | 11/2010 | Perry, Jr. et al. |
| 2010/0293371 A1 | 11/2010 | Thayer et al. |
| 2010/0299399 A1 | 11/2010 | Wanser et al. |
| 2010/0299450 A1* | 11/2010 | Mendell ............ H04L 29/12066 709/238 |
| 2010/0312837 A1 | 12/2010 | Bodapati et al. |
| 2010/0313119 A1 | 12/2010 | Baldwin et al. |
| 2011/0083079 A1 | 4/2011 | Farrell et al. |
| 2011/0093769 A1 | 4/2011 | Dunn et al. |
| 2011/0145342 A1 | 6/2011 | Berger et al. |
| 2011/0173272 A1 | 7/2011 | Carvalho et al. |
| 2011/0179275 A1 | 7/2011 | Thayer et al. |
| 2011/0179362 A1 | 7/2011 | Craddock et al. |
| 2011/0185172 A1 | 7/2011 | Thayer et al. |
| 2011/0225245 A1 | 9/2011 | Bhogal et al. |
| 2011/0314391 A1 | 12/2011 | Chang et al. |
| 2013/0080775 A1* | 3/2013 | Liebmann ........... H04L 63/0471 713/168 |

OTHER PUBLICATIONS

SpamProbe v0.7 README, Sep. 11, 2002.
Relson, Multiple Wordlists, Mar. 15, 2006.
How to Avoid Unwanted Email, ACM, Mar. 1998, vol. 41, No. 3, pp. 88-95.
Tschabitscher, Sending an Email to Multiple Recipients, Webpage from about.com, Apr. 2010.
Tschabitscher, How to Send an Email to Undisclosed Recipients. Webpage from about.com, Apr. 2010.
Send separate cmd email to multiple individual recipients. Webpage from febooti.com, Apr. 23, 2007.
[Mailman-Users] webmail issues. Webpage from python.org, Feb. 25, 2002.
WebMail Assistant for Hotmail and Yahoo. Webpage from soft14. com, Apr. 2010.
Send Personally. Webpage from Trialr.com, Apr. 2010.
SuperMailer. Webpage from Trialr.com, Apr. 2010.

(56) References Cited

OTHER PUBLICATIONS

E-mail and URL link (http://mymail.websitepros.com/Include/includeAuth.cfm?show=help.html) to User Manual for Innovative Systems product, E-mail, Wed. Sep. 5, 2007, pp. 1-3.
Webstie Pros, Webmail User Guide, Jul. 2002, Website Pros, (http://mymail.websitepros.com/Include/includeAuth.cfm?show=help.html).
How to use Lotus Notes 6, Mar. 4, 2003, Publisher: Que, ISBN: 07897-2796-X, Pertinent pages: Part 5.
http://office.microsoft.com/en-us/word-help/field-codes-mergefield-field-HP005186172.aspx, printed Aug. 2012 but refers to Word 2003, one page.
http://office.microsoft.com/en-us/word-help/add-fields-to-a-form-letter-or-other-mail-merge-document-HP005187661.aspx?CTT =3, printed Aug. 2012 but applies to Word 2003, pp. 1-2.
http://login.salesforce.com/help/doc/en/valid_merge_fields.htm, 2000 pp. 1-3.
http://www.edtechninja.com/2009/01/mail-merge/, Jan. 2009, pp. 1-9.

Outlook Mail Merge Sender—Send Personalized Emails to Distribution List, published Oct. 31,2009 http://web.archive.org/web/20091 031131 926/http://www. accmsoft.com/office-outlook/mail-merge-se.
Boyce, "Microsoft Office Outlook 2003 Inside Out", Nov. 12, 2003, Microsoft Press, p. 706-712.
Microsoft et al. "Use Mail merge to send personalized e-mail messages to your email address list" Jun. 18, 2010.
Carbera et al. "Special Edition Using Microsoft Word 2002" Jun. 2001.
MailChimp.com et al. "How to use Merge Tags"; Feb. 21, 2010 retrieved from web.archive.org.
Braden, RFC 1123, Requirements for Internet Hosts—Application and Support, Oct. 1989.
Freed & Borenstein, RFC 2045, Multipurpose Internet Mail Extensions (MIME), Nov. 1, 1996.
Resnick, RFC 2822, Internet Message Format, Apr. 1, 2001.
Crocker, RFC 822, Standard for ARPA Internet Text Messages, Aug. 13, 1982.

* cited by examiner

SYSTEM AND METHODS FOR MULTIPLE EMAIL SERVICES HAVING A COMMON DOMAIN

FIELD OF THE INVENTION

The present invention generally relates to email delivery, and, more specifically, to systems and methods for efficiently and effectively splitting an email address domain amongst multiple email services.

BACKGROUND OF THE INVENTION

The Internet comprises a vast number of computers and computer networks that are interconnected through communication links. The interconnected computers exchange information using various services. In particular, a server computer system, referred to herein as an email server, web server, server device, server, or the like, may receive connections through the Internet from one or more remote client computer systems, and may send to or receive from the remote client computer system one or more email messages. Further, the email server may connect with various other email servers or other server types throughout the Internet to effect the delivery of email messages either through sending outgoing email messages, receiving incoming email messages, or propagating email messages along to other email servers.

When an outgoing email message is to be sent, an email server checks the email address domain in the recipient address (e.g., "example.com" in the example email address "username1@example.com") and queries a Mail Exchange (MX) record at a Domain Name Service (DNS) server to determine where to send the email message having that particular address domain. The MX record contains message exchange information and points to an "A" record in the DNS server, the A record containing at least one proper Internet Protocol (IP) address of the recipient email server to which the email message is to be sent. The DNS server will respond with at least one of the IP addresses in the A record. The email server then sends the email message to the recipient email server located at that IP address. The recipient email server for that particular recipient domain (indicated by the MX record), and more specifically, the Mail Transfer Agent (MTA) of the recipient email server, is subsequently tasked with determining the particular username or email inbox to deliver the received email message. Notably, the MX record does not distinguish between individual usernames or specific addresses within a particular domain.

Though suitable for some purposes, such a process does not meet the needs of all applications and settings because the structure of the MX record within the DNS allows only for a domain-level determination of where to send an email message. In this process it is not possible to establish multiple email addresses utilizing a single email domain where the multiple email addresses are spread across different email service providers. For example, a first email address, (e.g., username1@example.com) cannot be serviced by a first email service provider while a second email having the same domain (e.g., username2@example.com) is serviced by a second email service provider. Thus, organizations and individuals are limited to utilizing a single email service provider to service all email address or usernames within their domain.

DETAILED DESCRIPTION OF THE PREFERRED EMBODIMENT

Figure 1:
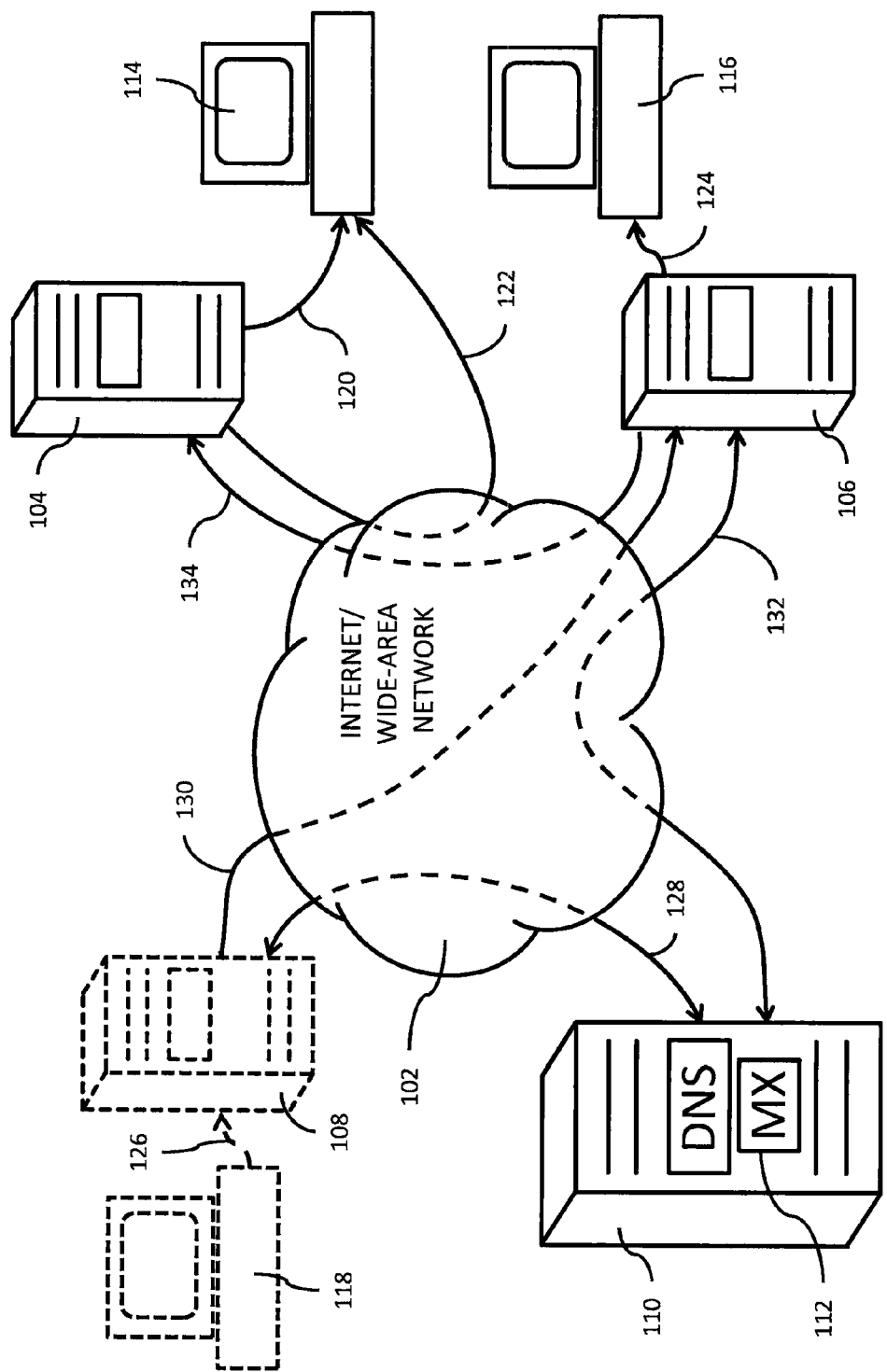
FIG. 1 is a diagram of a system and associated contextual operating environment in accordance with various embodiments of the present disclosure.

The present invention overcomes the aforementioned drawbacks by providing a system and methods for enabling servicing of a plurality of email addresses having a same email address domain and to be serviced by two or more distinct email services having distinct email servers. This allows, for example, an organization (or individual) to have some email addresses serviced at a first email service provider while having other email addresses with the same email address domain being serviced at a second email service. Thus, different features or levels of email servicing that may be available with different email service providers can be utilized for different email accounts (e.g., different personnel within an origination), even though the email accounts have the same email address domain. This maintains an outwardly singular appearance by having all the email addresses utilize the same address domain that is independent of whether that email address is serviced by one email service provider or another.

In one implementation, the present disclosure describes a method including creating an email forwarding account at a second email server of a second email service to forward an original email message to a first email server of a first email service as a forwarded email message. The original email message has an original recipient address including a user name (NAME) and an original domain (origDOMAIN) with a format of NAME@origDOMAIN. The forwarded email message has a forwarded recipient address that includes an appended intermediary domain (intDOMAIN) and has a format of NAME@origDOMAIN.intDOMAIN. The first email server receives the forwarded email message and an email domain modification module detects and removes the intermediary domain in the forwarded recipient address to form a modified forwarded email message with a modified forwarded recipient address of format NAME@origDOMAIN, which matches the original recipient address. The first email server delivers the modified forwarded email message to an email account with an address corresponding to the modified forwarded recipient address and that is serviced by the first email service. The method further includes altering a Domain Name Service (DNS) Mail Exchange (MX) record to indicate that an email message with a domain matching the intermediary domain is to be sent to the first email service, and an email message with a domain matching the original domain is to be sent to the second email service.

In another embodiment, the present disclosure describes a method including receiving at the first email server of the first email service the forwarded email message from the second email server of the second email service. The forwarded email message includes a forwarded recipient address having a format of NAME@origDOMAIN.intDOMAIN, which is a forwarded version of an original email message having a format of NAME@origDOMAIN. A DNS MX record indicates the first email service as the proper recipient email service for any email message having an email address domain matching the intermediary domain, and indicates the second email service as the proper recipient email service for any email message having an email address domain matching the original domain. An email domain modification module at the first email server removes the intermediary domain from the forwarded recipient address to form a modified forwarded email message with a modified forwarded recipient address, which matches the original recipient address. The method also includes delivering the modified forwarded email message to an email account having an address corresponding to the modified forwarded recipient address and being serviced by the first email service.

In yet another embodiment, the present disclosure describes an email server of a first email service including a network interface configured to receive the forwarded email message from a different email server associated with a second email service. The forwarded email message being a forwarded version of an original email message, the original email message having an original recipient address having a format NAME@origDOMAIN and the forwarded email message having a forwarded recipient address having a format NAME@origDOMAIN.intDOMAIN, and wherein a DNS MX record indicates that an email message with a domain matching the intermediary domain is to be sent to the first email service and an email message with a domain matching the original domain is the be sent to the second email service. The email server further includes an email domain modification module that detects and removes the intermediary domain from the forwarded recipient address to form a modified forwarded email message. The modified forwarded email message includes a modified forwarded recipient address having a form NAME@origDOMAIN. The email server also includes a Mail Transfer Agent (MTA) configured to deliver the modified forwarded email message to an email account having a corresponding address and being serviced by the first email server.

Referring first to FIG. 1, a diagram of an email system and an example contextual setting is illustrated in accordance with various embodiments. The Internet or other wide-area network 102 provides a communication means between various devices. For example, in an email setting, a first email server 104 and a second email server 106 may be communicatively coupled to the Internet 102 via various known networking communication techniques and protocols, for example, a hard-wire connection using Transmission Control Protocol and Internet Protocol ("TCP/IP"). Other known connection and communication technologies may be suitable in various application settings. According to various embodiments, a third email server 108 can be communicatively coupled to the Internet 102 in a similar fashion. So configured, the first email server 104, the second email server 106, and the third email server 108 can communicate with each other or other servers or client devices over the Internet 102. A Domain Name System (DNS) server 110 is also communicatively coupled to the Internet 102 and is able to communicate with the first, second, and third email servers 104, 106, 108.

The DNS server 110 includes a Mail Exchange (MX) record 112 that lists one or more A records containing Internet Protocol (IP) addressees associated with a particular email service provider for each registered email address domain. For example, an email address domain for a small company (which may, for example, run its own email service or utilize a small email service provider) may have one or a small number of IP addresses listed for its domain (e.g., the domain "example.com" in the email address "username@example.com"). Conversely, large email service providers (e.g., Gmail™, Yahoo!®, or Microsoft Office365™) typically have numerous IP addresses listed for their respective email address domains (e.g., gmail.com, yahoo.com, or hotmail.com), which point to multiple different incoming email servers that operate together as part of their respective email service. Having multiple IP addresses point to different email servers allows the large email service providers to spread intake and processing of the sometimes millions of emails a second over the multiple email servers. In most instances, the DNS server 110 is configured to return one or more A records in response to an MX query from an email server. In the case of multiple A records being listed in the MX record for a particular domain (e.g., gmail.com), the returned A record(s) can be selected by the DNS server 110 based on a randomized selection scheme or a round-robin selection scheme, as is understood in the art. This DNS-based randomization or pseudo-randomization helps distribute incoming emails across the multiple incoming email servers of these large email service providers. Multiple backup email servers may be designated as well. Other DNS MX query return mechanisms and procedures not discussed herein may provide similar or different results.

The DNS MX record 112 is configured such that the DNS server 110 can return the one or more A records based on the queried email address domain (e.g., "example.com"). The DNS server 110 cannot distinguish between various usernames associated with a domain. For example, the DNS server 110, in responding to an MX query, cannot distinguish between two different email addresses (e.g., username1@example.com and username2@example.com). The DNS server 110 will only utilize the domain ("example.com") to search the MX record 112 and will return one or more of the A records having IP addresses corresponding to email servers that are to receive emails addressed to that domain.

Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7213).

It is commonly understood by those of skill in the art that, for the above reasons, different email addresses within a particular email address domain cannot be assigned to different email servers or email service providers based on the user name. For example, the DNS server 110 cannot intentionally return an A record from the MX record 112 having an IP address for a first email server associated with a first email service provider for username1@example.com, and return an A record having another IP address for a second email server associated with a second email service provider for username2@example.com. Different A records may unintentionally be provided in response to respective MX queries for these two different email addresses. However, such an occurrence is coincidental and due to the DNS-based randomization schemes discussed above. Thus, presently, multiple distinct email service providers cannot be selected to service different email addresses within a particular domain. Instead, a single email service provider must be selected to service all email addresses within a particular domain. The embodiments disclosed herein address such shortcomings.

A single set of A records for an email address domain listed in an MX record could, in theory, allow two different email service providers operating on that same set of email servers to service different email addresses based on the username. The Mail Transfer Agent (MTA) of the shared email server could deliver an incoming email message to the proper email service provider on that email server based on the username portion of the email address. However, in practice an email server or set of email servers will not be shared by different or distinct email service providers. For purposes of this application, different or distinct email service providers (for example, a first email service provider and a second email service provider) are assumed to utilize distinct email servers or sets of email servers, which servers are not shared between the distinct email service providers. For example, a first email service provider may utilize the first email server 104 (possibly in addition to other email servers) and a second email service provider may utilize the second email server 106 (possibly in addition to other email servers); however, both the first and second email service providers do not provide their services using the same email server(s).

In one embodiment, a first client device 114 is communicatively coupled to the first email server 104, a second client device 116 is communicatively coupled to the second email server 106, and a third client device 118 is communicatively coupled to the third email server 108. The client devices 114, 116, 118 may include various computing devices including, without limitation, a desktop computer, a laptop computer, a tablet, a smart phone, other network servers, or any other electronic device capable of communicating with an email server over the Internet 102 or directly. Such a client device 114, 116, 118 may include one or more processing devices, display devices, user interfaces, and/or network interfaces. Typically, though not always, the client device 114, 116, 118 is utilized by a user to access an email server 104, 106, 108 to send and receive email messages. The client devices 114, 116, 118 may also be used to connect to other servers to perform other tasks, such as, for example, connecting to a web server to retrieve webpage information. The user may be an individual, a group of individuals, a business or other organization, or any other entity that desires to send or receive email messages, where the purpose may be of a commercial or a non-commercial nature.

To communicate with the email servers 104, 106, 108, the client devices 114, 116, 118 may connect directly thereto or through the Internet 102. Referring to the connections between the first client device 114 and the first email server 104, two options are illustrated: a local connection 120 and an Internet-based connection 122. The local connection 120 may be implemented through a Local Area Network (LAN), or may even be a direct physical connection between the first client device 114 and the first email server 104. Alternatively or additionally, an internet-based connection 122 can be provided between the first client device 114 and the first email server 104. Although the connection 124 between the second client device 116 and the second email server 106 and the connection 126 between the third client device 118 and the third email server 108 are illustrated as direct connections, such illustrations are for functional purposes only. The connections 124 and 126 may be direct or internet-based connections similar to those connections 120, 122 illustrated between the first client device 114 and the first email server 104, or may be other connection types altogether.

The client devices 114, 116, 118 may communicate with the email servers 104, 106, 108 via any electronic communication medium, communication protocol, and computer software suitable for transmission of data over the Internet 102 or another network. Examples include, respectively and without limitation: a wired connection, WiFi or other wireless network, cellular network, or satellite network; Transmission Control Protocol and Internet Protocol ("TCP/IP"), Global System for mobile Communications ("GSM") protocols, code division multiple access ("CDMA") protocols, and Long Term Evolution ("LTE") mobile phone protocols; web browsers such as MICROSOFT INTERNET EXPLORER, MOZILLA FIREFOX, and APPLE SAFARI; email clients such as OUTLOOK, APPLEMAIL, THUNDERBIRD and other email client software modules; and other client-executable software modules.

Client devices 114, 116, 118 may execute software email clients that utilize various protocols to communicate with an email server. For example, a client device 114, 116, 118 may utilize Post Office Protocol version 3 (POP3) or Internet Message Access Protocol (IMAP) to receive (e.g., download) email messages from the email server 104, 106, 108. A client device 114, 116, 118 may utilize the Simple Mail Transport Protocol (SMTP) to send an email message to the email server 104, 106, 108 to be, in turn, sent to the recipient email address. Alternatively, a webmail solution can be utilized to allow the client device 114, 116, 118 to communicate with the email server 104, 106, 108 to draft, read, send, and receive email messages (as well as to handle other email functions typically associated with email client software). In a webmail approach, the actual email messages then remain on the email server 104, 106, 108 and are simply accessed via the webmail interface.

Typically, a webmail interface is provided in a web page via a browser. The information in such a web page is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, media, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

As mentioned above, using known techniques, it is not possible to split servicing of multiple different email addresses within a single email domain across multiple distinct email service providers. For example, it was not possible to service a first email address of a particular domain at a first email service and service a second email address of that same particular domain at a second email service. Instead, a single email service provided must be selected to service all email addresses within a particular domain while using previous solutions.

A situation may exist where an organization or an individual may wish to maintain a singular domain for email addresses, but service different email addresses at different email service providers. For example, an organization may be using a legacy email service provider (the "first email service" in various embodiments), but may wish to migrate some, but not all, of the email addresses over to a new email service provider (the "second email service" in various embodiments). This may be desired, for example, to initiate a trial period of the new email service provider prior to shifting the entire organization to the new email service provider. The new email service provider may have a higher cost than the legacy email service provider and the organization may wish to reduce its expenditures during such a trial period by maintaining some or a majority of the email addresses at the lower-cost legacy email service provider.

In another example, an organization may wish to provide multiple different feature sets or levels of email servicing to different users within the organization. For example, a president of the organization may require a higher level of email servicing or a richer feature set than, for example, a summer intern may require. However, an email service provider offering the higher level or richer feature set may charge more for an email account than another email service provider. Thus, in order to reduce costs, the organization may wish to split email addresses amongst the two (or more) email service providers and provide the costlier option to only those users that require such features while maintaining other users at the cost-effective email service provider.

No matter the motivation behind a desire to spread email addresses across various email service providers, it can be important for organizations, and particularly businesses, to maintain an image of stability and solidarity to its clients and customers. Thus, it is advantageous to leave the email addresses and domain associated with the organization unchanged, even or especially during periods where an organization may be growing or changing (such as while changing or testing email service providers), without loss of email functionality.

According to various embodiments, a method of enabling multiple email service providers to service different email addresses within a particular domain is provided. The method includes altering the DNS MX record 112 for that particular email domain so that it points to email servers associated with the new email service provider. As noted above, however, not all email addresses are to be serviced by the new email service provider and some (if not a majority) of the email addresses will continue to be serviced at the legacy email service provider. Thus, a plurality of email forwarding accounts are created at the new email service provider (e.g., the second email server or second email service) to forward to the legacy email service provider received email messages addressed to email accounts that will continue to be serviced at the legacy email service provider. The email forwarding accounts append an intermediary domain onto the end of the email addresses. The email messages are then forwarded to the forwarding email address, including the appended intermediary domain. In doing so, the sending email server (of the new email service) will initiate a query of the MX record 112 at the DNS server 110 for the domain of the forwarding email address (being the appended intermediary domain). The MX record 112 will have been previously altered or configured to indicate one or more email servers of the legacy email service provider as the intended recipient email servers for the intermediary domain. The new email service provider then forwards the email message to the legacy service provider.

The legacy email service provider receives the forwarded email message at one of its email servers indicated by the MX query. An email domain modification module working as part of or in cooperation with the Mail Transfer Agent (MTA) of the recipient email server of the legacy email service provider recognizes the intermediary domain and removes it from the forwarded recipient address. In response, a modified forwarded recipient address is formed which matches the original recipient address. The MTA then delivers the email message to a corresponding email address having the original email domain, which email address is serviced by the legacy email service provider.

With continued reference to FIG. 1, the above process of enabling multiple email service providers to service different email addresses within a particular domain is illustrated in greater detail in accordance with various embodiments. In a typical fashion, a user of the third client device 118 may desire to send an email message to a recipient user. The intended recipient user has an email address, called an "original recipient address" in these embodiments, which has a user name (NAME) and an original domain (origDOMAIN). This email address has the standard format of NAME@origDOMAIN.

Figure 2:
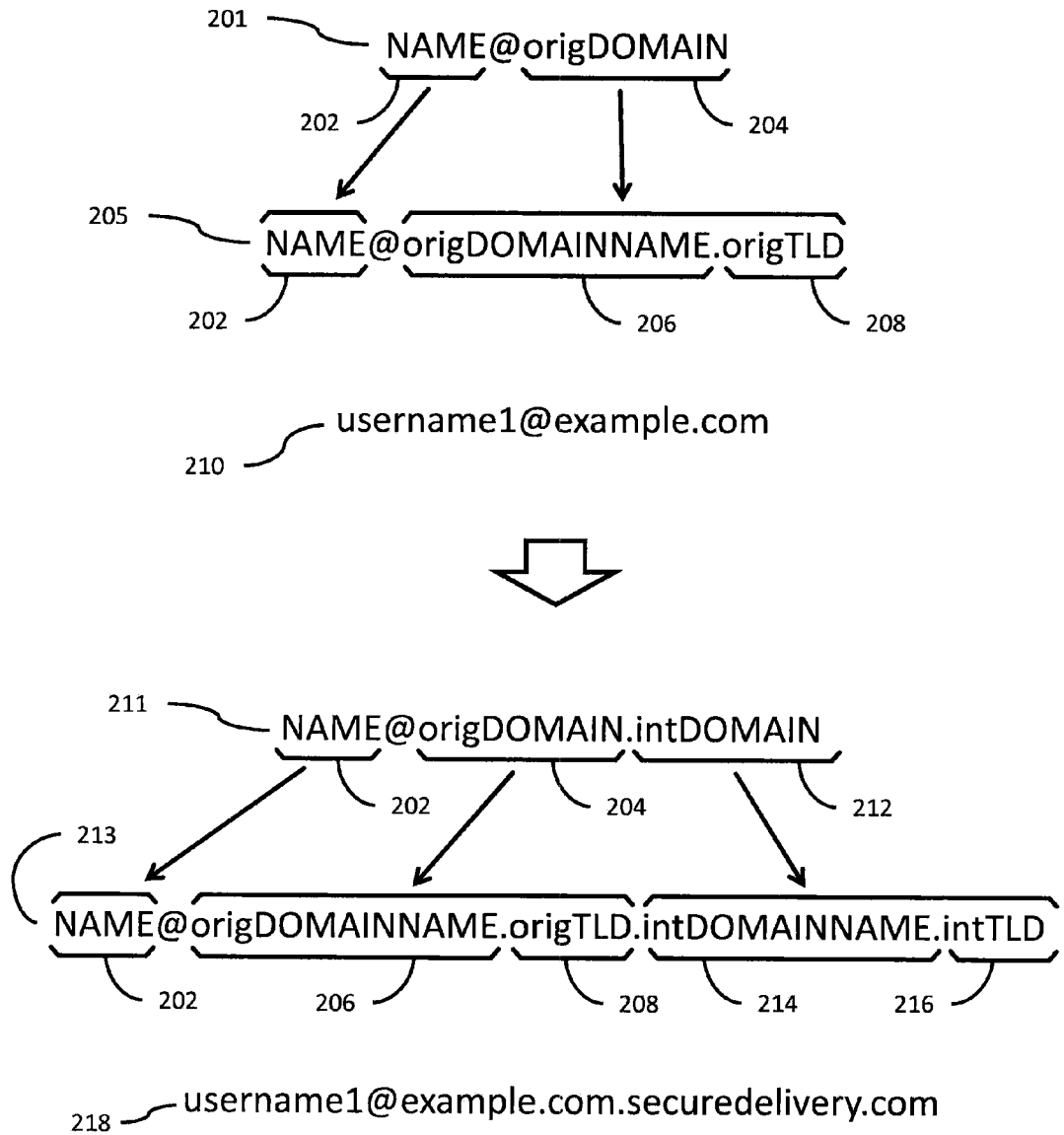
FIG. 2 illustrates various example particulars of the system and methods in accordance with various embodiments of the present disclosure.

FIG. 2 shows an example original recipient address 201 including the user name (NAME) 202 and the original domain (origDOMAIN) 204. As shown in an expanded view 205 of the original recipient address 201, the original domain 204 includes an original domain name (origDOMAINNAME) 206 and an original Top Level Domain (origTLD) 208. TLDs may include ".com", ".biz", ".net", ".gov", or other common TLDs that follow the domain name within an email address. An example email address 210 of this format is provided as "username1@example.com." The original domain 204 is used in these examples instead of the full original domain name 206 and original TLD 208 for purposes of simplicity. However, it is implied that the original domain 204 includes the original domain name 206 and original TLD 208.

With reference to FIGS. 1 and 2, the user of the third client device 118 initiates sending of the email message to the original recipient address 201 through connection 126 (via, for example, an email client or webmail interface) to the third email server 108. The third email server 108 then communicates 128 with the DNS server 110 to perform a query of the Mail Exchange (MX) record 112 to determine an IP address of an email server associated with the original domain 204. In this example, the DNS server 110 returns the A record having the IP address of the second email server 106 (of the second email service provider) as part of the proper recipient email service for any email message having an email address domain matching the original domain.

The third email server 108 sends 130 the original email message through the Internet 102 to be delivered to the second email server 106. Typically, the email message is sent using SMTP and may pass through multiple servers en route. The second email server 106 receives the original email message. A Mail Transfer Agent (MTA) at the second email server 106 determines that the original recipient address of the original email message corresponds to a forwarding email account that has been created at the second email server 106. The second email server 106 initiates a forwarding process to forward the original email message to the forwarding email account via a forwarded recipient address 211 associated with the forwarding email account as described below.

The forwarding process may include forming the forwarded recipient address 211 from the original recipient address 201. As described above, the original recipient address 201 includes the user name (NAME) 202 and the original domain (origDOMAIN) 204. The original domain 204 includes an original domain name (origDOMAIN-NAME) 206 and an original TLD (origTLD) 208. An example original email address 210 is provided as "username1@example.com". The second email server 106 transforms the original recipient address 201 to the forwarded recipient address 211 by appending an intermediary domain (intDOMAIN) 212 onto the end of the original recipient address 201 separated therefrom by a period or dot ("."). It should be understood that creating the forwarded recipient address 211 can be performed directly by the second email server 106 through a module that creates the forwarded recipient addresses 211 on the fly by actually performing the appending. Alternatively, such a process may have been performed previously by a computer or manually by a user during the creation of the forwarding email account(s) at the second email server 106, wherein the forwarded recipient address 211, including the intermediary domain, is simply saved as the forwarding email address for the forwarding email account at the second email server 106.

As for the original domain name 204, an expanded intermediary domain 212 includes an intermediary domain name (intDOMAINNAME) 214 and an intermediary TLD (intTLD) 216. An example forwarded recipient address 218 is provided as "username1@example.com.securedelivery.com". The example forwarded recipient address 218 is shown here as having an intermediary domain 212 of "securedelivery.com", though any suitable intermediary email domain 214 and/or intermediary TLD 216 may be used as is appropriate. The intermediary domain 212 acts as an alias of sorts for an email server or email service. There may be many different intermediary domains that point to many different email service providers, and each different email service provider may have a plurality of intermediary domains that point back to the individual service provider. In such an approach, an email domain modification module (discussed below) would simply need to be aware of which intermediary domains it is to detect and remove from incoming email messages.

The second email server 106 may initiate the procedure to forward the email message to the forwarded recipient address 211. The second email server 106 communicates 132 with the DNS server 110 to perform a query of the MX record 112 based on the intermediary domain 212. The DNS server 110 returns one A records having IP addresses corresponding to the first email server 104 (and/or other email servers), which are part of the first email service provider, thus indicating the first email service provider as the proper recipient email service provider for any email message having an email address domain matching the intermediary domain 212. Upon receipt of the response of the MX query from the DNS server 110, the second email server 106 sends 134 the email message to the first email server 104 of the first email server provider through the Internet 102 as a forwarded email message destined for the forwarded recipient address 211.

The first email server 104 receives the forwarded email message and recognizes or detects the intermediary domain 212 of the forwarded recipient address 211. The first email server 104 may then remove the intermediary domain 212 from the forwarded recipient address 211 to form a modified forwarded email message having a modified forwarded recipient address of format NAME@origDOMAIN. That is, the modified forwarded recipient address matches the original recipient address as the first email server 104 effectively undoes the appending of the intermediary domain. After forming the modified forwarded email message, the first email server 104 delivers the modified forwarded email message to an email account corresponding to the modified forwarded recipient address, which email account is serviced by the first email service provider. As described before, the first client device 114 can then connect to the first email server 104 (directly via connection 120 or through the Internet 102 via connection 122) to receive and/or view the modified forwarded email message.

Figure 3:
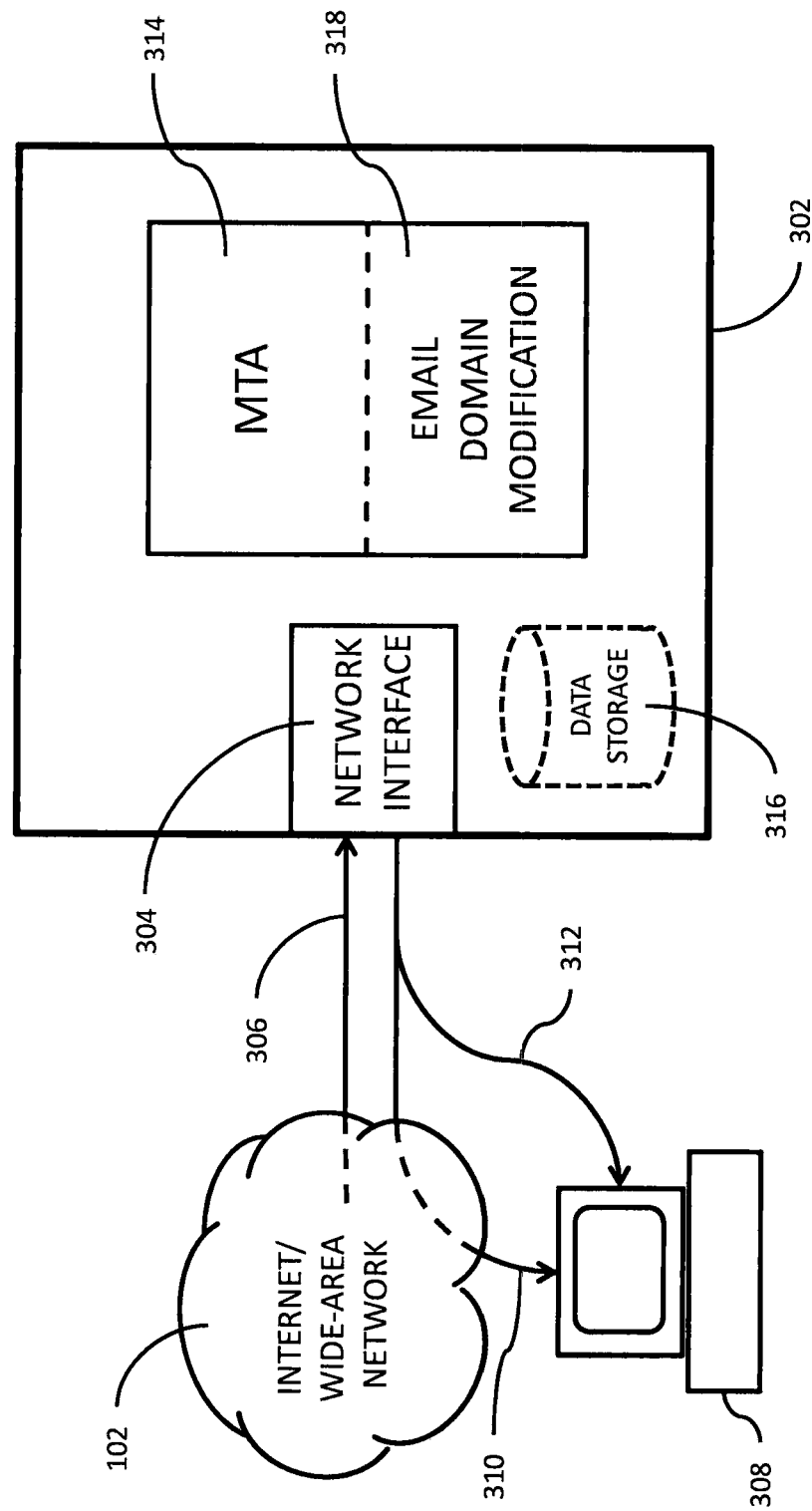
FIG. 3 is a functional schematic diagram of an email server in accordance with various embodiments of the present disclosure.

Turning now to FIG. 3, a functional schematic diagram of an example email server 302 is illustrated in accordance with various embodiments. This example email server 302 may correspond to the first email server 104 illustrated in FIG. 1 and described above or other email servers. The email server 302 is configured to be associated with an email service provider, such as the first email service provider. The email server 302 includes a network interface 304 that is configured to receive 306 a forwarded email message from a different email server (such as the second email server 106) associated with a different email service (such as the second email service). The forwarded email message may be a forwarded version of an original email message and may include a forwarded recipient address including an intermediary domain, with such email messages and corresponding recipient addresses being described above with respect to FIGS. 1 and 2. However, as described above, each email service each have at least one email account configured to service email messages with an email address domain matching the original domain. The network interface may be in communication with other email servers and/or one or more client devices 308 via communication connections 310 over the Internet 102 and/or direction connections 312, both of which are described above.

The email server 302 also includes a Mail Transfer Agent (MTA) 314. One example MTA 314 is provided by CLOUDMARK® (San Francisco, Calif.), though many other different MTAs may be suitable in various application settings. The MTA 314 operates to receive incoming email messages and to route or deliver those incoming email messages to various recipient email inboxes or email accounts associated with the email server 304. These received emails (as well as other data) may be stored in data storage 316 located within the email server 302 or elsewhere.

The email server 302 also includes an email domain modification module 318. As is indicated by the dotted line separating the email domain modification module 318 and the MTA 314, the email domain modification module 318 is either a part of the MTA 314 or is configured to operate in coordination with the MTA 314. In one embodiment, the email domain modification module 318 detects the intermediary domain as part of the forwarded recipient address (though in other embodiments, other modules or elements of the email server 302 may perform the detection step). Once detected, the email domain modification module 318 removes the intermediary domain from the forwarded recipient address to form a modified forwarded email message including a modified forwarded recipient address.

After formation of the modified forwarded email message, the MTA 314 effects delivery of the modified forwarded email message to an email account corresponding to the modified forwarded recipient address, which email account is serviced by the associated email service (e.g., the first email service provider).

The email server 302 may include one or more processing devices (such as one or more central processors), hard drives, memory modules, or other computer hardware elements as may be required to perform the functionality of an email server as described herein. The email server 302 may be one of many email servers, for example, as part of an email server farm configured to service a large number of client devices 308 and email accounts. A plurality of email servers may be communicatively coupled together through a network with other control computers configured to control aspects of the email servers and to route communications to and from the email servers.

Returning now to FIG. 1, in one embodiment, the second email server 106 may receive at least one other email message having an email address domain matching the original domain, but having a different user name than the original email message (e.g., username2@example.com instead of or in addition to username1@example.com). The MTA of the second email server 106 may determine that the recipient address of this other email message corresponds to an email account serviced by the second email server (which is associated with the second email service provider). The MTA can then deliver this other email message to that email account instead of forwarding it to the first email server 104. A second client device 116 can then connect 124 to the second email server 106 to retrieve and/or view this other email message.

It should be understood that the second email server 106 and corresponding second email service provider comprise the "new email service provider" in the above described embodiments, whereas the first email server 104 and the corresponding first email service provider comprise the "legacy email service provider." By this, the other email message may be addressed to an email address (e.g., username2@example.com) that was moved from the first email service provider (legacy email service provider) to the second email service provider (new email service provider). Accordingly, it should be understood that the second email server 106 may have been configured to service this other email account (corresponding to the email address of the other email message, e.g., username2@example.com) after the first email server 104 had already been configured to service an email account corresponding to the same email address. The email account that existed at the first email server 104 (e.g., username2@example.com) may have been discontinued or suspended when this same email account at the second email server 106 was created, or it may actually remain open and operational at the first email server 104 and simply be redundant to the new email account at the second email server 106. Also, in one embodiment, this older email account at the first email server 104 may be converted to a forwarding email account to send received emails outward toward the second email server 106, being the new email service provider for that same email address.

Figure 4:
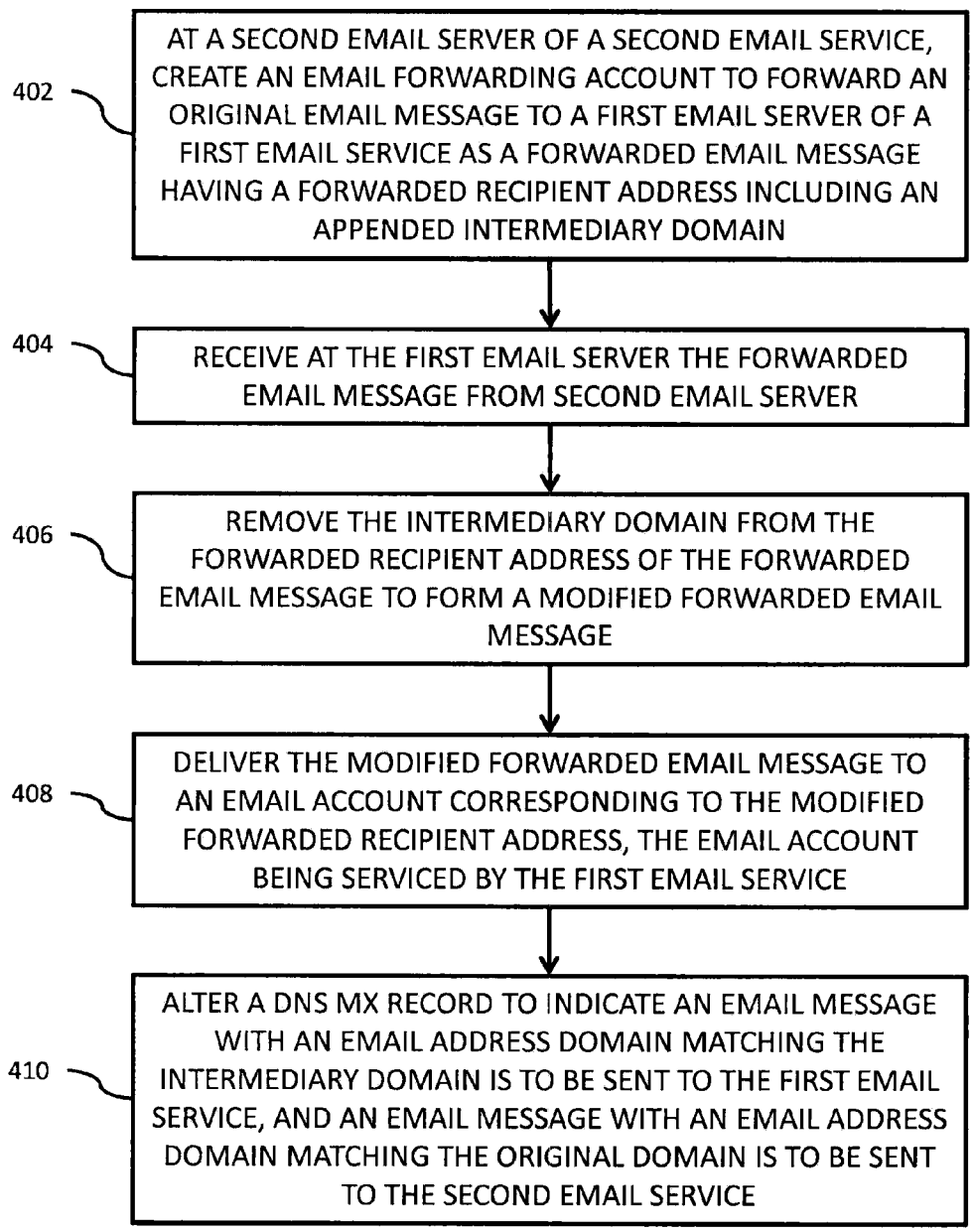
FIG. 4 is a flow diagram of a method in accordance with various embodiments of the present disclosure.

Referring now to FIG. 4, a schematic flow diagram illustrates a method 400 in accordance with various embodiments. The method 400 may be performed or executed at or by various email servers, such as, for example, the first email server 104 or the second email server 106. At step 402, an email forwarding account is created at a second email server 106 corresponding to a second email service to forward an original email message to a first email server 104 corresponding to a first email service. The forwarded email message has a forwarded recipient address that includes an appended intermediary domain (discussed above).

The creation of the email forwarding account may be performed by different parties according to various approaches. For example, an operator or user of the second email service provider could effect the creation of the email forwarding accounts. In another example, an operator or user of the first email service provider could effect the creation of the email forwarding accounts. Email forwarding accounts, in a general sense, can typically be set up by most users or subscribers of an email service. Thus, in one example, if an operator or user of the first email service provider was granted access to the second email service provider (e.g., by setting up one or more email accounts with the second email service provider), this operator or user could set up the email forwarding accounts.

At step 404, the first email server receives the forwarded email message from the second email server. At step 406, the intermediary domain is removed from the forwarded recipient address of the forwarded email message to form a modified forwarded email message. In one embodiment, the removal of the intermediary domain is performed by an email domain modification module of the first email server.

At step 408, the modified forwarded email message is delivered to an email account corresponding to the modified forwarded recipient address. This email account is serviced by the first email service. In one embodiment, an MTA of the first email server effects the delivery of the modified forwarded email message.

At step 410, a DNS MX record is altered to indicate that an email message with an email address domain matching the intermediary domain is to be sent to the first email service and that an email message with an email address domain matching the original domain is to be sent to the second email service. Typically, though not always, this step is performed early in implementation of an email migration process. Thus, for example, the DNS MX record is modified such that the original domain points to the second email server before the second server will receive an original email message, which is subsequently forwarded back to the first email server. Further, the DNS MX record may be modified so that intermediary domain points to the first email server before the forwarded email message is delivered to the first email server from the second email server. In fact, the DNS MX record may have been modified at a much earlier date to configure the intermediary domain to point to the first email server. Modification of the DNS MX record includes a procedure where one or more A records for new or different IP addresses replace or are added to existing A records for a previously existing domain. For example, the original domain may have previously pointed to the first email server, but the MX record may be subsequently modified such that the original domain points to the second email server. Modification of the DNS MX record also may include a procedure of creating a new MX record entry for a domain that did not previously exist on the MX record.

Various alternate embodiments are now discussed. In one alternate embodiment, instead of utilizing the email domain modification module of the first email server 104 to remove the appended intermediary domain from the received recipient address, the MTA simply delivers the email to an email account that includes the intermediary domain (like the example forwarded recipient address 218 in FIG. 2, "username1@example.com.securedelivery.com"). Thus, in this approach, email accounts that remain on the legacy email service provider (e.g., at the first email server 104) will actually be changed (or new accounts crated) so that their actual new email address includes the intermediary domain. These legacy email account users will still receive emails sent to their old email addresses (e.g., email addresses without the intermediary domain), but those messages will then be forwarded to their changed or new email accounts that include the intermediary domain.

In this alternate embodiment, and in certain approaches, it may be beneficial to set up one or more forwarding accounts within the legacy email service provider to forward emails received at the legacy email service provider that include only the original domain without the intermediary domain. These email messages are forwarded to the changed or newly created email accounts that do include the intermediary domain. This is because a change to the MX record (e.g., so that the original domain points to the new email service provider) may take days or weeks to propagate through all the DNS servers internationally. During this propagation delay time, if the legacy email service users have already switched to the new email accounts (with the intermediary domain), then emails that are accidentally sent to the legacy email service provider that include only the original domain will not be checked, will be lost, or will be bounced back. Forwarding accounts at the legacy email service provider ensure these emails are properly forwarded to the new or changed email accounts.

Also, in certain approaches, to hide the real email address of a legacy email account user, the email domain modification module can be configured to remove the appended intermediary domain from the sender's email address for outbound email messages. This process can includes possibly altering the header of the outgoing email message. By this, an external recipient of this outgoing email is made to believe that the email is from an email address having the original domain name (even if they review the header of the email) despite the fact that the email message was sent from an email account including the intermediary domain.

In yet another embodiment, the roles of the first email server 104 and the second email server 106 may be swapped. For example, the first email server 104 may correspond to the new email service, while the second email service 106 may correspond to the legacy email service. By this, email addresses that are migrating to the new email service are forwarded to the email servers of the new email service provider (e.g., the first email server 104) from the legacy email service provider (e.g, the second email server 106) by using the intermediary domain technique. The email domain modification module is then installed as part of the email servers of the new email service provider instead of as part of the legacy email servers. Unlike the previous embodiments, the MX record 112 should not be altered to change the original domain to point to the new email service provider; it should remain pointing to the legacy email service provider. However, the MX record 112 should point the intermediary domain toward the new email service provider (instead of toward the legacy email service). This solution works well when the new email service provider is the primary actor (e.g., attempting to pull email addresses away from the legacy email service provider) as they will have access to their own email servers to implement the domain name modification module. Conversely, the previously described embodiments are better suited when the legacy email service provider desires to migrate certain email addresses to the new email service provider as the legacy providers will have access to their own email servers to implement the domain name modification module. It should be understand that this alternative embodiment implements the same process described above with respect to FIGS. 1 and 2. However, the role of each email server 104, 106 is reversed (e.g., "new" versus "legacy").

So configured, the described system and processes provides a way to split multiple email addresses having different user names while having the same email domain amongst multiple email service providers. Because the same domain is used for emails serviced by both the first and second email service providers, a customer is not aware of the split in service providers and the appearance of solidarity and stability is maintained. Further, in certain embodiments, users of email addresses being serviced by legacy email service providers need not even be aware of the processes being performed, particularly that their email is being forwarded to them from a different email server. These users will continue to utilize the legacy email service provider to send and receive emails without any apparent change for them or their contacts. Further still, and according to various embodiments, because outbound emails are sent from email accounts having the same domain from both email service providers, a recipient of an email is unaware of whether the email was sent from the first email service provider or the second email service provider.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Various embodiments of the invention may be implemented at least in part in any conventional computer programming language. For example, some embodiments may be implemented in a procedural programming language (e.g., "C", and the like), or in an object oriented programming language (e.g., "C++" "JAVA", and the like). Other embodiments of the invention may be implemented as preprogrammed hardware elements (e.g., application specific integrated circuits, FPGAs, and digital signal processors), or other related components.

In some embodiments, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention has been described in terms of one or more preferred embodiments, and it should be appreciated that many equivalents, alternatives, variations, and modifications, aside from those expressly stated, are possible and within the scope of the invention.

We claim:

1. A method comprising:
at a second email server of a second email service configured to send email messages to a first email server of a first email service, creating an email forwarding account configured to forward an original email message to the first email server as a forwarded email message, the original email message having an original recipient address including a user name (NAME) and an original domain (origDOMAIN) and having a format of NAME@origDOMAIN, the forwarded email message having a forwarded recipient address including an appended intermediary domain (intDOMAIN) and having a format of NAME@origDOMAIN.intDOMAIN;
at the first email server, receiving the forwarded email message;
at the first email server, an email domain modification module detecting the intermediary domain in the forwarded recipient address and removing the intermediary domain from the forwarded recipient address to form a modified forwarded email message including a modified forwarded recipient address having a format of NAME@origDOMAIN, the modified forwarded recipient address matching the original recipient address;
at the first email server, delivering the modified forwarded email message to an email account having an address corresponding to the modified forwarded recipient address, the email account being serviced by the first email service;
adding one or more Internet Protocol (IP) addresses to an existing DNS MX record; and
altering a Domain Name System (DNS) Mail Exchange (MX) record to indicate an email message with an email address domain matching the intermediary domain is to be sent to the first email service and an email message with an email address domain matching the original domain is to be sent to the second email service.

2. The method of claim 1 further comprising:
at the first email server, receiving the forwarded email message having the forwarded recipient address including the appended intermediary domain (intDOMAIN) and having the format of NAME@origDOMAIN.intDOMAIN, wherein the original domain further comprises an original domain name (origDOMAINNAME) and an original Top Level Domain (origTLD), the original domain having a format of origDOMAINNAME.origTLD, and wherein the intermediary domain further comprises an intermediary domain name (intDOMAINNAME) and an intermediary Top Level Domain (intTLD), the intermediary domain having a format of intDOMAINNAME.intTLD.

3. The method of claim 1 wherein the first email service and the second email service each have at least one email account configured to service email messages with an email address domain matching the original domain.

4. The method of claim 1 further comprising:
the second email server being configured to deliver at least one other email message to an email account serviced by the second email service, the at least one other email message having an email address domain matching the original domain and having a different user name than the original email message.

5. The method of claim 4 further comprising:
configuring the second email server to service the email account corresponding to the email address of the at least one other email message after the first email server has been configured to service an email account corresponding to the email address of the at least one other email message.

6. The method of claim 1 further comprising:
at the first email server, the email domain modification module at least one of operating as a part of a Mail Transfer Agent (MTA) of the first email server and operating in coordination with the MTA of the first email server.

7. A method comprising:
at a first email server associated with a first email service, receiving a forwarded email message from a second email server associated with a second email service, the forwarded email message including a forwarded recipient address including a user name (NAME), an original domain (origDOMAIN), and an intermediary domain (intDOMAIN), the forwarded recipient address having a format of NAME@origDOMAIN.intDOMAIN and being a forwarded version of an original email message, the original email message including an original recipient address including the user name and the original domain and having a format of NAME@origDOMAIN;

at the first email server, adding one or more IP addresses to an existing Domain Name System (DNS) Mail Exchange (MX) record to indicate the first email service as the proper recipient email service for any email message having an email address domain matching the intermediary domain and indicates the second email service as the proper recipient email service for any email message having an email address domain matching the original domain;

at the first email server, removing the intermediary domain from the forwarded recipient address by an email domain modification module to form a modified forwarded email message having a modified forwarded recipient address having a format of NAME@origDOMAIN, the modified forwarded recipient address matching the original recipient address;

delivering the modified forwarded email message to an email account having an address corresponding to the modified forwarded recipient address, the email account being serviced by the first email service.

8. The method of claim 7 further comprising:
at the first email server, receiving the forwarded email message having the forwarded recipient address format of NAME@origDOMAIN.intDOMAIN, wherein the original domain further comprises an original domain name (origDOMAINNAME) and an original Top Level Domain (origTLD), the original domain having a format of origDOMAINNAME.origTLD, and wherein the intermediary domain further comprises an intermediary domain name (intDOMAINNAME) and an intermediary Top Level Domain (intTLD), the intermediary domain having a format of intDOMAINNAME.intTLD.

9. The method of claim 7 wherein the first email service and the second email service each have at least one email account configured to service email messages with an email address domain matching the original domain.

10. The method of claim 7 further comprising:
the second email server being configured to deliver at least one other email message to an email account serviced by the second email service, the at least one other email message having an email address domain matching the original domain and having a different user name than the original email message.

11. The method of claim 10 further comprising:
configuring the second email server to service the email account corresponding to the email address of the at least one other email message after the first email server has been configured to service an email account corresponding to the email address of the at least one other email message,
configuring the first email server to service the email account having the address corresponding to the modified forwarded recipient address after the second email server has been configured to service an email account having an address corresponding to the original recipient address, wherein the original recipient address matches the modified forwarded recipient address.

12. The method of claim 7 further comprising:
at the first email server, the email domain modification module at least one of operating as a part of a Mail Transfer Agent (MTA) of the first email server and operating in coordination with the MTA of the first email server.

13. An email server configured to be associated with a first email service, the email server comprising:
a network interface configured to receive a forwarded email message from a different email server associated with a second email service, the forwarded email message being a forwarded version of an original email message, the original email message having an original recipient address including a user name (NAME) and an original domain (origDOMAIN) and having a format NAME@origDOMAIN, the forwarded email message having a forwarded receipt address including an intermediary domain (intDOMAIN) and having a format NAME@origDOMAIN.intDOMAIN, wherein a Domain Name System (DNS) Mail Exchange (MX) record is altered by adding one or more IP addresses to an existing DNS MX record to indicate an email message with an email address domain matching the intermediary domain is to be sent to the first email service and an email message with an email address domain matching the original domain is to be sent to the second email service;

an email domain modification module configured to detect the intermediary domain in the forwarded recipient address and remove the intermediary domain from the forwarded recipient address to form a modified forwarded email message including a modified forwarded recipient address having a format of NAME@origDOMAIN, the modified forwarded recipient address matching the original recipient address; and a Mail Transfer Agent (MTA) configured to effect delivery of the modified forwarded email message to an email account corresponding to the modified forwarded recipient address, the email account being serviced by the first email service.

14. The email server of claim 13 further comprising:
the network interface configured to receive the forwarded email message having the forwarded receipt address having the format NAME@origDOMAIN.intDOMAIN, wherein the original domain further comprises an original domain name (origDOMAINNAME) and an original Top Level Domain (origTLD), the original domain having a format of origDOMAINNAME.origTLD, and wherein the intermediary domain further comprises an intermediary domain name (intDOMAINNAME) and an intermediary Top Level Domain (intTLD), the intermediary domain having a format of intDOMAINNAME.intTLD.

15. The email server of claim 13 further comprising:
the network interface configured to receive the forwarded email message from the different email server associated with the second email service, wherein the first email service and the second email service each have at least one email account configured to service email messages with an email address domain matching the original domain.

16. The email server of claim 13 wherein the email domain modification module is at least one of a part of the MTA and configured to operate in coordination with the MTA.

* * * * *